(12) United States Patent
Wu

(10) Patent No.: US 6,325,188 B1
(45) Date of Patent: Dec. 4, 2001

(54) LINEAR MOTION DAMPING DEVICE

(76) Inventor: Chin-Long Wu, No. 70, Lane 13, Ren Yi Road, Tou Liu City, Yun Lin Hsien (TW)

(*) Notice: Subject to any disclaimer, the term of this patent is extended or adjusted under 35 U.S.C. 154(b) by 0 days.

(21) Appl. No.: 09/379,909

(22) Filed: Aug. 24, 1999

(51) Int. Cl.⁷ .................................................. F16F 11/00
(52) U.S. Cl. ............................................... 188/381; 188/67
(58) Field of Search .................................... 188/381, 134, 188/378, 67, 129, 282.7, 282.8; 74/89.15, 424.8 R

(56) References Cited

U.S. PATENT DOCUMENTS

| | | | |
|---|---|---|---|
| 2,471,857 | * 5/1949 | Bleakney et al. | 188/378 |
| 4,094,387 | * 6/1978 | Pelat et al. | 188/381 |
| 4,474,273 | * 10/1984 | Le Pierres et al. | 188/381 |
| 4,524,851 | * 6/1985 | Sawano et al. | 188/381 |
| 5,689,995 | * 11/1997 | Heckel, Jr. | 188/67 |

* cited by examiner

Primary Examiner—Robert J. Oberleitner
Assistant Examiner—Mariano Sy
(74) Attorney, Agent, or Firm—Browdy and Neimark

(57) ABSTRACT

A linear motion damping device comprises a cylindrical body having a receiving compartment and an axial hole, in which a dragging rod is slidably disposed such that the threaded portion of the dragging rod is engaged with a fastening member which is confined to turn around the dragging rod at such time when the dragging rod is exerted on by an external force along the axial direction of the dragging rod. The fastening member acts to provide the dragging rod with a damping force at the time when the dragging rod is engaged in a displacement along the axial direction thereof.

12 Claims, 7 Drawing Sheets

LINEAR MOTION DAMPING DEVICE

FIELD OF THE INVENTION

The present invention relates generally to a damping device, and more particularly to a linear motion damping device.

BACKGROUND OF THE INVENTION

The conventional linear motion damping device, such as an oil pressure cylinder or air pressure cylinder, is generally formed of a cylindrical body which is provided therein with a dragging rod intended to be pushed or pulled. The dragging rod is provided with a resistance by a hydraulic oil, gas, or spring at the time when the dragging rod is engaged in the axial displacement. The linear motion damping device is widely used in various fields, such as an exercise machine, a hatchback door, a furniture, a structure door, a smoke exhausting window, etc. As the dragging rod of the linear motion damping device is displaced, the fluid contained in the cylindrical body is exerted on by a constant pressure, thereby resulting in a gradual sealing deterioration. The damping device is thus useless. The implication is that the load of the conventional linear motion damping device is often limited such that the speed at which the dragging rod displaces axially is compromised. For this reason, the sealing structure of a damping device with a large load must be specially designed at the expense of the structural simplicity of the damping device.

SUMMARY OF THE INVENTION

It is the primary objective of the present invention to provide a linear motion damping device which is simple in construction and is capable of sustaining a greater load without an increase in the volume of the damping device.

It is another objective of the present invention to provide a linear motion damping device which is provided with different resistance forces at the time when the dragging rod of the damping device is pushed or pulled to displace axially.

In keeping with the principle of the present invention, the foregoing objectives of the present invention are attained by a linear motion damping device which is essentially composed of a cylindrical body, a dragging rod, and a fastening member. The cylindrical body is provided with a receiving compartment and an axial hole in communication with two ends of the receiving compartment. The dragging rod is provided with a threaded portion and is slidably received in the axial hole and the receiving compartment. The fastening member is engaged with the threaded portion of the dragging rod such that the fastening member turns around the axial direction of the dragging rod at the time when the dragging rod is exerted on by an external force, thereby providing the dragging rod with a damping force along the axial displacement of the dragging rod.

The foregoing objectives, features and functions of the present invention will be more readily understood upon a thoughtful deliberation of the following detailed description of the embodiments of the present invention with reference to the accompanying drawings.

DETAILED DESCRIPTION OF THE INVENTION

Figure 1:
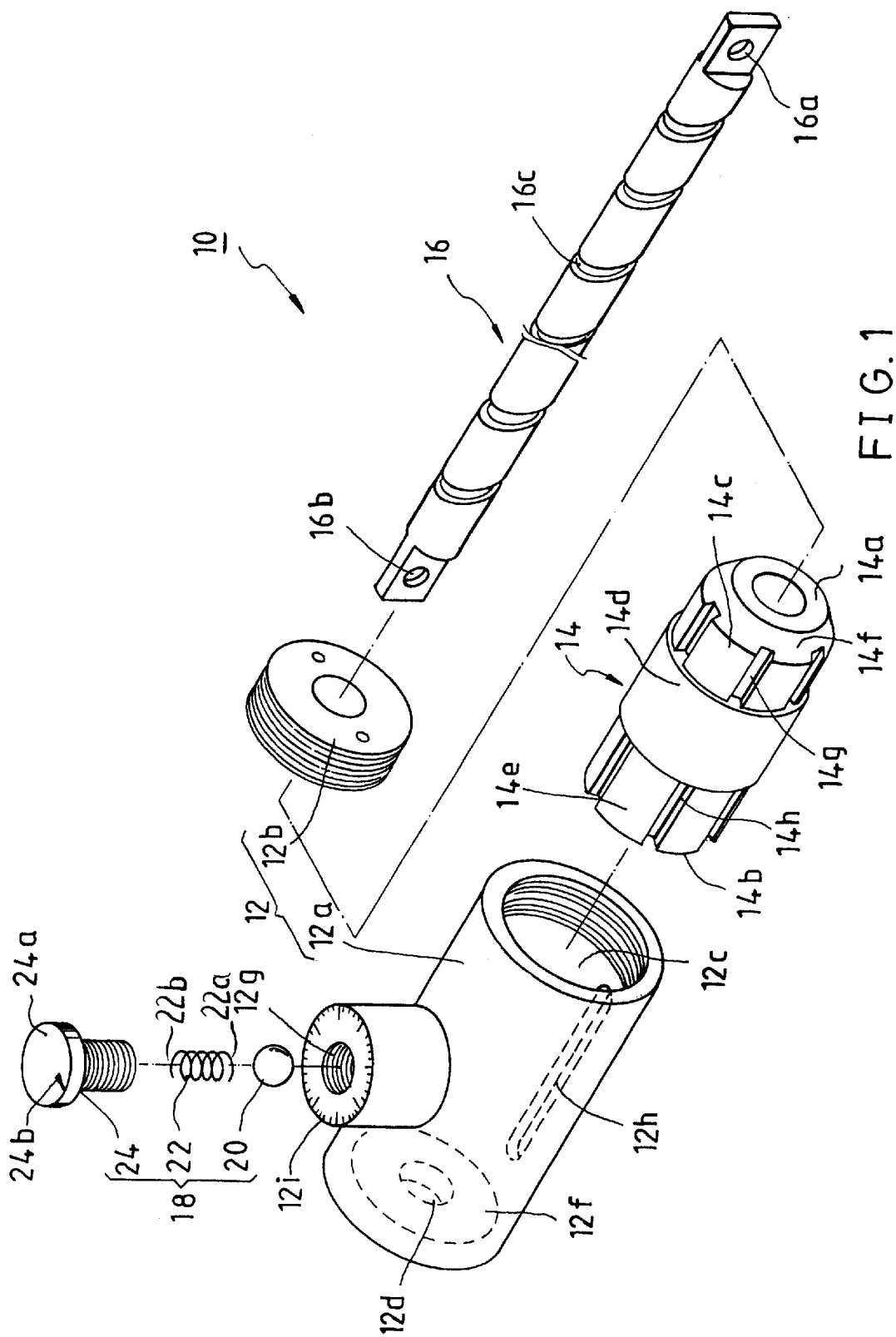
FIG. 1 shows an exploded view of a first preferred embodiment of the present invention.
Figure 2:
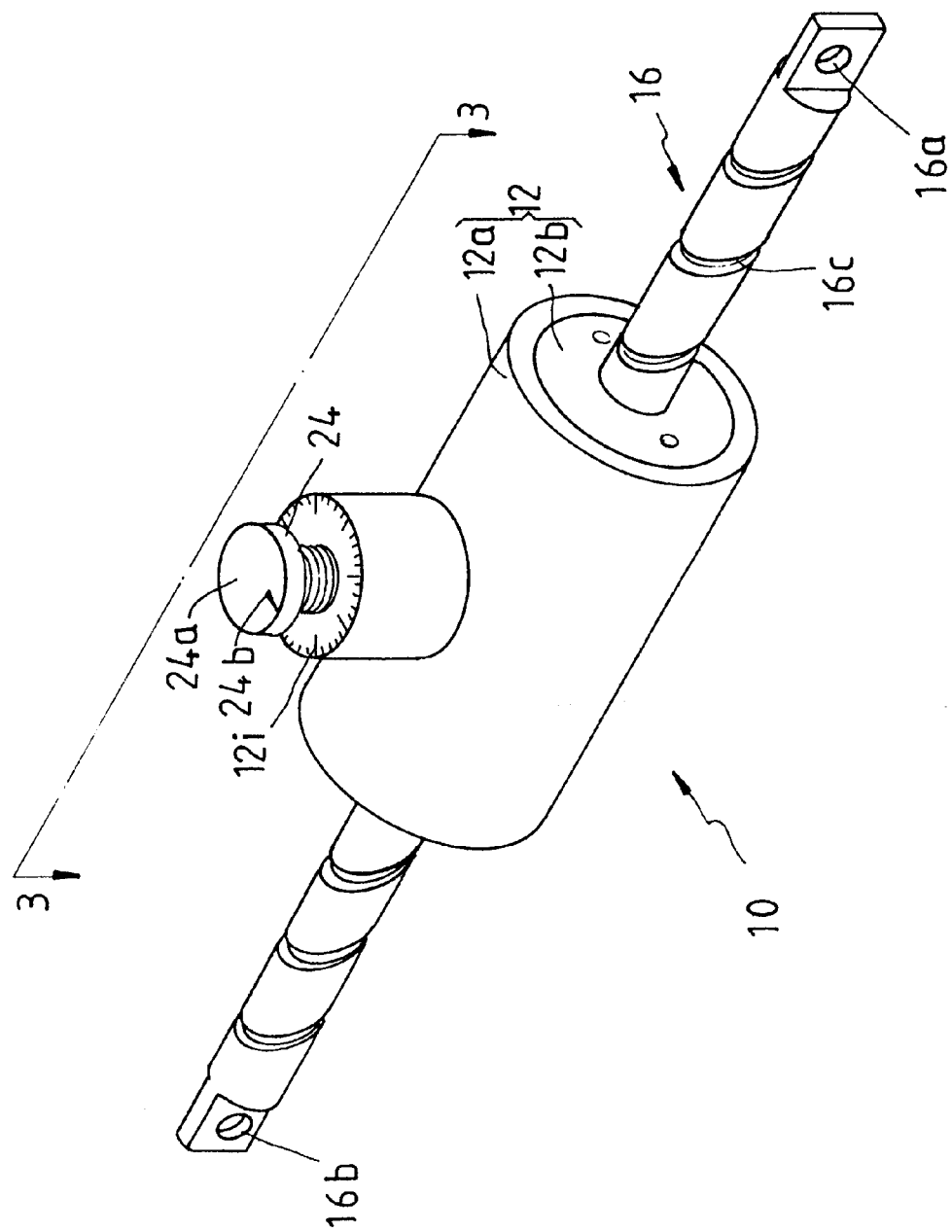
FIG. 2 shows a perspective view of the first preferred embodiment of the present invention in combination.
Figure 3:
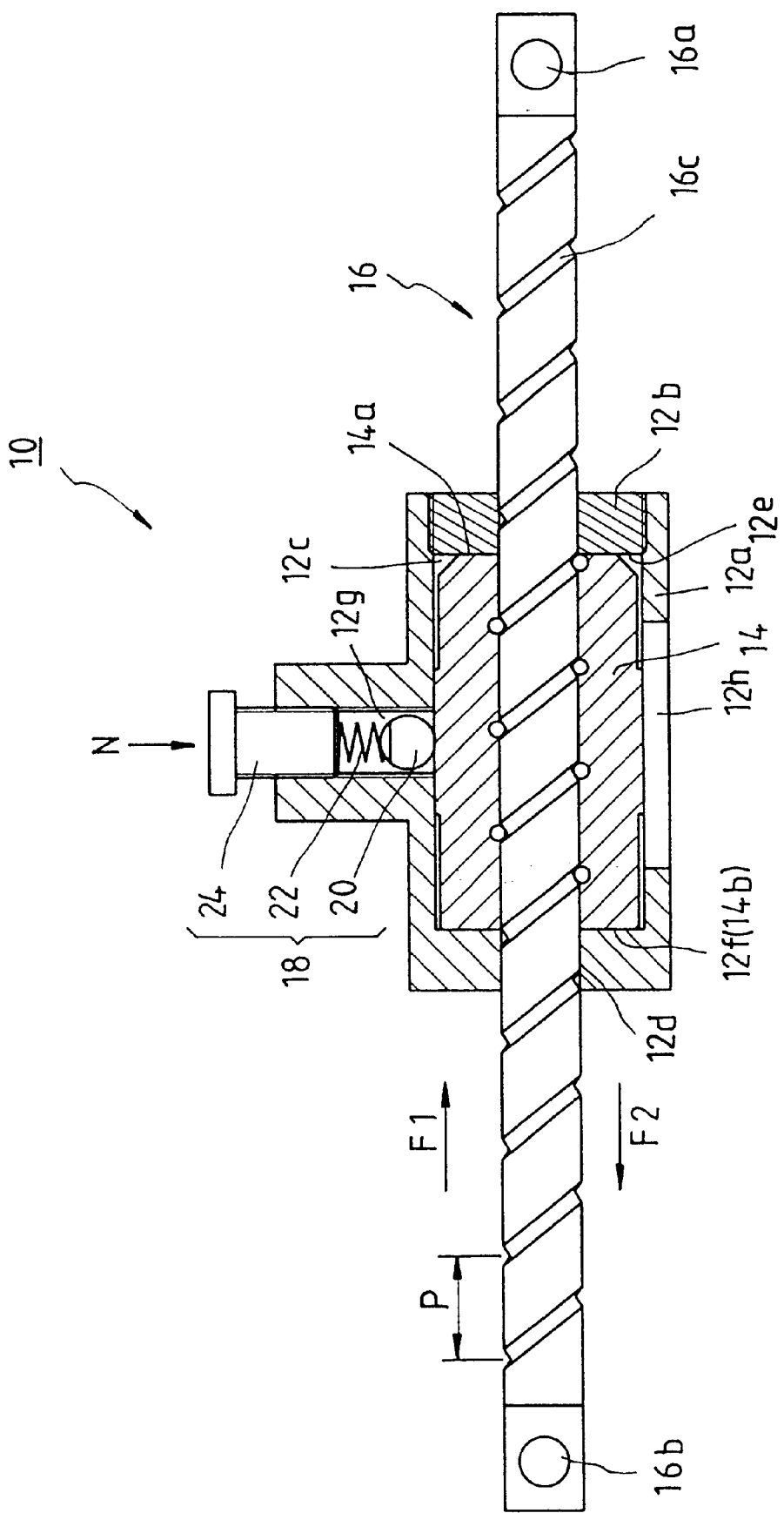
FIG. 3 shows a sectional view taken along the direction indicated by a line 3—3 as shown in FIG. 2.

As shown in FIGS. 1–3, a linear motion damping device 10 embodied in the present invention comprises a cylindrical body 12, a fastening member 14, a dragging rod 16, and an adjustment device 18.

The cylindrical body 12 has a main body 12a of a cylindrical shape, and a base 12b fastened with the main body 12a. The cylindrical body 12 is provided therein with a receiving compartment 12c of a cylindrical shape. The receiving compartment 12c is provided at two opposite ends thereof with an axial hole 12d coaxial with the receiving compartment 12c, thereby enabling the receiving compartment 12c to be in communication with the atmospheric air. The connection place of two opposite ends of the receiving compartment 12c and the axial hole 12d is provided with a first stepped surface 12e and a second stepped surface 12f. The cylindrical body 12 is provided with a threaded hole 12g and a cooling hole 12h, which extend along the radial direction of the receiving compartment 12c and are in communication with the receiving compartment 12c. The threaded hole 12g is provided in the outer periphery thereof with a graduated scale 12i.

The fastening member 14 is a ball-type nut and is disposed in the receiving compartment 12c of the cylindrical body 12. The fastening member 14 has a first end surface 14a and a second end surface 14b. In addition, the fastening member 14 has a first segment 14c, a second segment 14d, and a third segment 14e, which are different in outer diameter, with the outer diameter of the second segment 14d being slightly smaller than the diameter of the receiving compartment 12c. The first segment 14c and the first end surface 14a form therebetween an angle 14f causing the area of the first end surface 14a to be smaller than the area of the second end surface 14b. The first segment 14c and the third segment 14e are provided with a plurality of grooves 14g and 14h, which are arranged equidistantly.

The dragging rod 16 is provided at both ends thereof with a connection hole 16a (16b) and is further provided with a threaded portion 16c. The dragging rod 16 is disposed in the cylindrical body 12 such that the threaded portion 16c is engaged with the fastening member 14.

The adjustment device 18 comprises a spherical body 20, a spring 22, and an adjustment screw 24. The spherical body 20 is a steel ball and is received in the threaded hole 12g of the cylindrical body 12 such that the spherical body 20 comes in contact with the second segment 14d of the fastening member 14. The spring 22 is received in the threaded hole 12g of the cylinder body 12 such that one end 22a of the spring 22 urges the spherical body 20. The adjustment screw 24 is engaged with the threaded hole 12g of the cylindrical body 12 such that the adjustment screw 24 comes in contact with other end 22b of the spring 22. The adjustment screw 24 is provided at one end surface 24a with a pointer 24b corresponding in location to the graduated scale 12i of the threaded hole 12g of the cylindrical body 12 for determining the depth of the engagement of the adjustment screw 24 with the threaded hole 12g.

In operation, when the dragging rod 16 of the damping device 10 of the present invention is acted on by an axially-oriented push force F1, the fastening member 14 is forced by the push force F1 to rotate around the axial direction of the dragging rod 16. In the meantime, the fastening member 14 is incapable of displacing along the axial direction of the dragging rod 16 in view of the first end surface 14a of the fastening member 14 being confined by the first stepped surface 12e of the receiving compartment 12c. As a result, the dragging rod 16 is capable of a linear displacement along the direction of the axially-oriented push force F1. Similarly, when the dragging rod 16 of the damping device 10 is exerted on by an axially-oriented pull force F2, the fastening member 14 is forced by the pull force F2 to rotate around the axial direction of the dragging rod 16. The fastening member 14 is incapable of displacing along the axial direction of the dragging rod 16 in view of the second end surface 14b of the fastening member 14 being confined by the second stepped surface 12f of the receiving compartment 12c. As a result, the dragging rod 16 is capable of a linear displacement along the direction of the axially-oriented pull force F2.

In order to enable the dragging rod 16 to displace linearly along the axial direction thereof, the axially-oriented external force, F1 or F2, acting on the dragging rod 16 must first overcome the resistance forces which are described hereinafter.

The first resistance force to be overcome is the resistance force which causes the fastening member 14 to rotate around the axial direction of the dragging rod 16. This resistance force is directly proportional to the diameter of the dragging rod 16 and is inversely proportional to the pitch P of the threaded portion 16c. In other words, the damping device 10 can be provided with a greater damping force by means of a dragging rod having a smaller pitch. Of course, a dragging rod with a greater diameter may be used, so as to provide the damping device 10 with a greater resistance force. In addition, the threaded portion 16c may have different pitches enabling the dragging rod 16 to displace at various speeds and to have various loads of resistance force.

The second resistance force to be overcome is a frictional torsion which is brought about by a friction force between the first end surface 14a and the first stepped surface 12e at such time when the dragging rod 16 is exerted on by the push force F1. The second resistance force to be overcome may also be a frictional torsion which is brought about by a friction force between the second end surface 14b and the second stepped surface 12f at the time when the dragging rod 16 is exerted on by the pull force F2. The frictional torsion is inversely proportional to a contact area. In light of the area of the first end surface 14a being smaller than the area of the second end surface 14b, the resistance force that is encountered with by the dragging rod 16 is smaller at the time when the dragging rod 16 is engaged in a linear displacement along the direction of the push force F1, as compared with the resistance force that is encountered with by the dragging rod 16 engaging in a linear displacement along the direction of the pull force F2. The dragging rod 16 can be thus provided with different resistance forces by such a design that the contact area between the first end surface 14a and the first stepped surface 12e is unequal to the contact area between the second end surface 14b and the second stepped surface 12f.

The third resistance force to be overcome is a friction force brought about between the second segment 14d of the fastening member 14 and the spherical body 20. The friction force is directly proportional to a normal force N exerting on the second segment 14d by the spherical body 20. This is attained by adjusting the depth in which the adjustment screw 24 is engaged with the threaded hole 12g of the cylindrical body 12, thereby resulting in a change in the magnitude of the normal force N.

The dragging rod 16 and the fastening member 14 of the present invention are engaged with each other by means of the ball-type threads. However, they may be engaged with each other by other means, such as metric threads, trapezoidal threads, round threads, etc., so as to provide the dragging rod 16 with various resistance force loads at such time when the dragging rod 16 is engaged in a linear displacement along the axial direction thereof. The first segment 14c and the third segment 14e of the fastening member 14 are provided with the grooves 14g, 14h. As a result, when the fastening member 14 rotates, the first segment 14c and the third segment 14e form a fanlike blast effect enabling the air to circulate in the receiving compartment 12c via the cooling holes 12h, thereby resulting in a reduction in temperature of the receiving compartment 12c.

Figure 4:
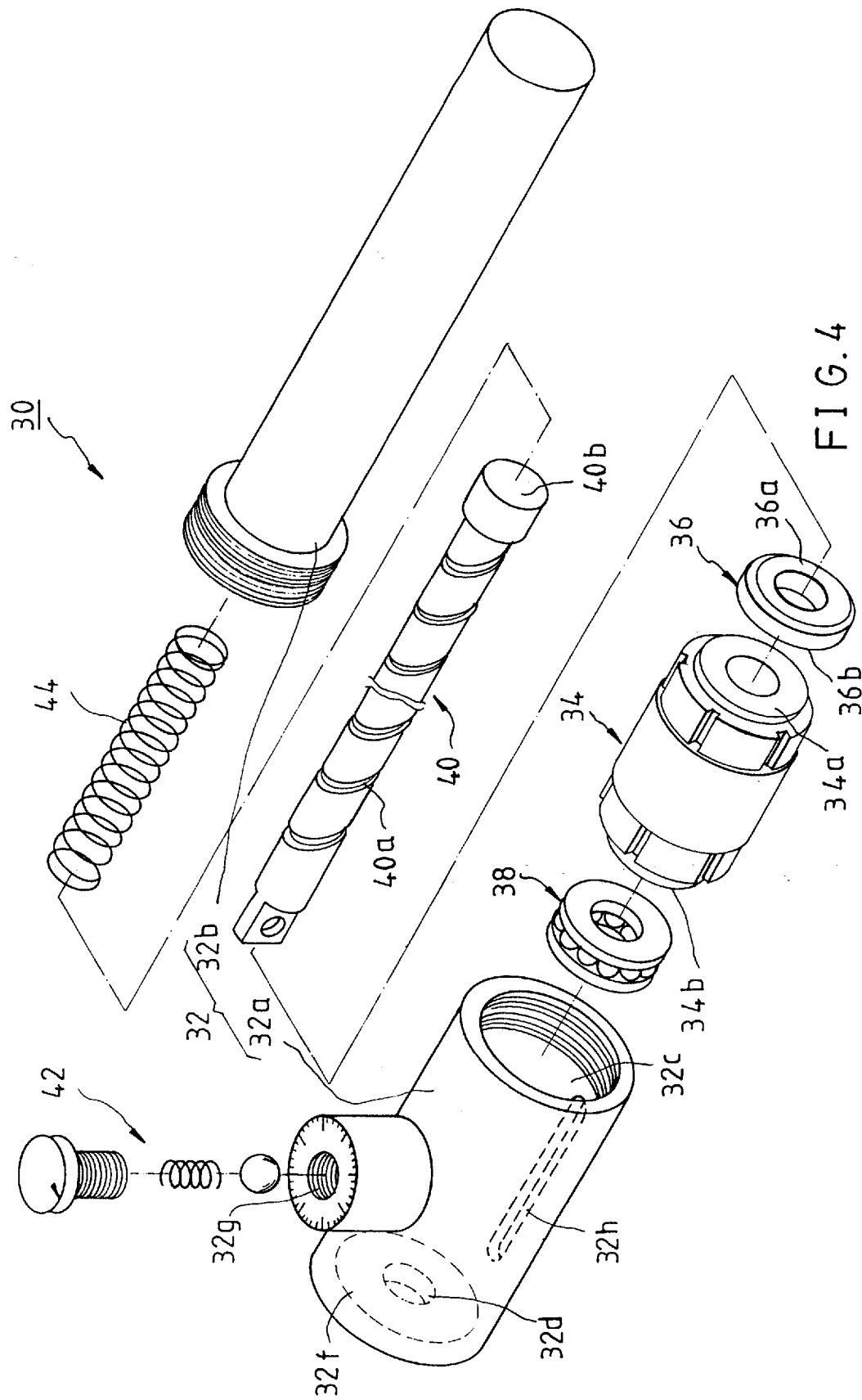
FIG. 4 shows an exploded view of a second preferred embodiment of the present invention.
Figure 5:
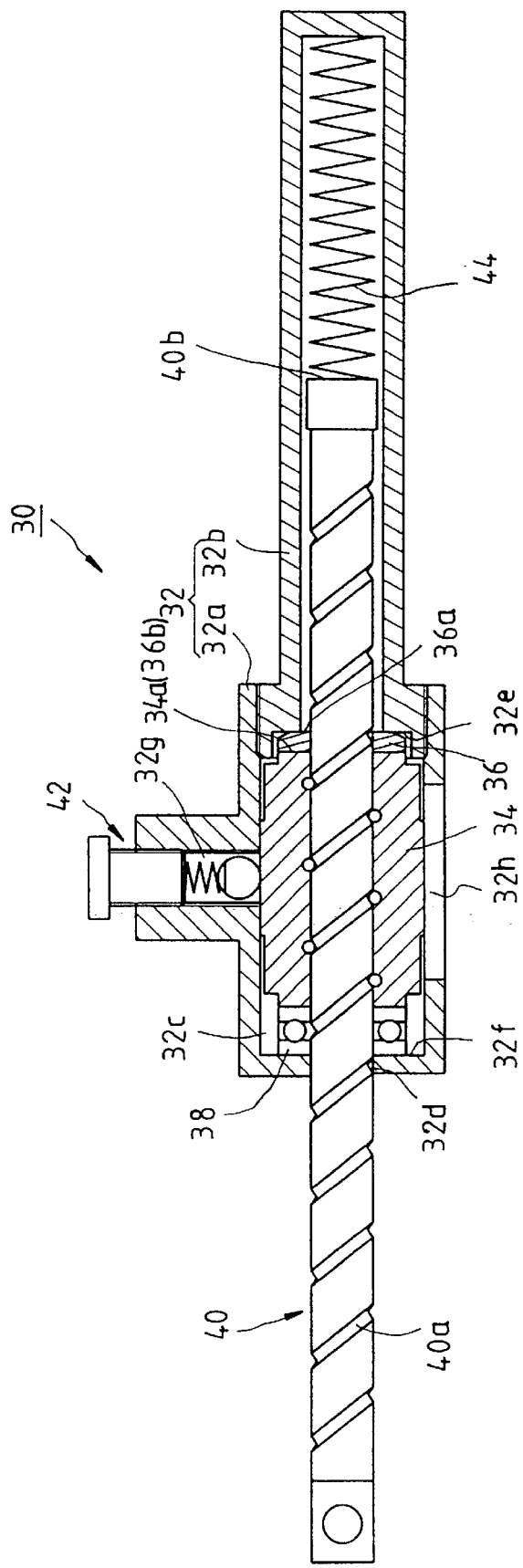
FIG. 5 shows a sectional view of the second preferred embodiment of the present invention.

As shown in FIGS. 4 and 5, a linear motion damping device 30 of the second preferred embodiment of the present invention comprises a cylindrical body 32, a fastening member 34, a first ring 36, a second ring 38, a dragging rod 40, and an adjustment device 42.

The cylindrical body 32 is formed of a main body 32a and a base 32b fastened with the main body 32a. The cylindrical body 32 is provided therein with a receiving compartment 32c of a cylindrical shape. The receiving compartment 32c is provided at two opposite ends thereof with an axial hole 32d coaxial with the receiving compartment 32c, thereby enabling the receiving compartment 32c to be in communication with the atmospheric air. The connection place of the two opposite ends of the receiving compartment 32c and the axial hole 32d is provided with a first stepped surface 32e and a second stepped surface 32f. The cylindrical body 32 is provided with a threaded hole 32g and a cooling hole 32h, which extend along the radial direction of the receiving compartment 32c and are in communication with the receiving compartment 32c. The axial hole 32d is provided therein with a return spring 44.

The fastening member 34 is a ball-type nut and is disposed in the receiving compartment 32c of the cylindrical body 32. The fastening member 34 has a first end surface 34a and a second end surface 34b.

The first ring 36 has a first end surface 36a and a second end surface 36b. The first ring 36 is located in the receiving compartment 32c of the cylindrical body 32 such that the first ring 36 is sandwiched between the first end surface 34a of the fastening member 34 and the first stepped surface 32e of the receiving compartment 32c.

The second ring 38 is a thrust bearing and is disposed in the receiving compartment 32c of the cylindrical body 32 such that the second ring 38 is sandwiched between the second end surface 34b of the fastening member 34 and the second stepped surface 32f of the receiving compartment 32c.

The dragging rod 40 is provided with a threaded portion 40a and is received in the first ring 36, the fastening member 34 and the second ring 38 such that one end 40b of the dragging rod 40 presses against one end of the return spring 44.

The adjustment device 42 is similar in construction to the adjustment device of the first preferred embodiment of the present invention.

In order to enable an axially-oriented external force to cause the dragging rod 40 to displace linearly along the axial direction of the dragging rod 40, a plurality of resistance forces must be first overcome. The first resistance force to be overcome is the resistance force acting on the fastening member 34 to turn around the axial direction of the dragging rod 40. The second resistance force to be overcome is the frictional resistance force that is brought about between the first end surface 36a of the first ring 36 and the first stepped surface 32e, or between the second ring 38 and the second stepped surface 32f. The third resistance force to be overcome is the frictional resistance force between the adjustment device 42 and the fastening member 34. The fourth resistance force to be overcome is the tension of the return spring 44. The tension of the spring 44 becomes a resistance force when the tension is opposite in direction to the axially-oriented external force. The tension of the spring 44 becomes a boost when the tension of the spring 44 is similar in direction to the axially-oriented external force. The user of the damping device may make use of the first ring and the second ring to provide the dragging rod 40 with various resistance forces in conjunction with a design that the contact area between the first ring and the first stepped surface is not equal to the contact area between the second ring and the second stepped surface. The first ring or the second ring is provided with a thrust bearing for providing the dragging rod 40 with various resistance forces.

Figure 6:
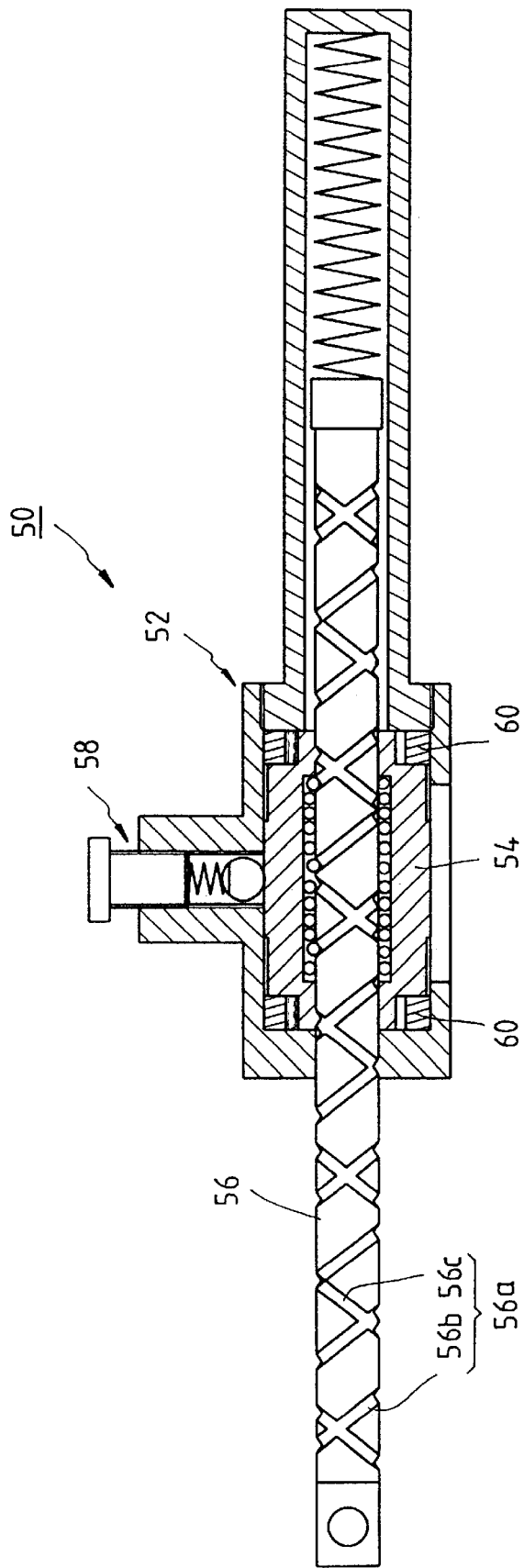
FIG. 6 shows a sectional view of a third preferred embodiment of the present invention.

As shown in FIG. 6, a damping device 50 of the third preferred embodiment of the present invention comprises a cylindrical body 52, a fastening member 54, a dragging rod 56, and an adjustment device 58.

The third preferred embodiment is different from the second preferred embodiment in that the fastening member 54 of the former is provided at both ends thereof with a one-way bearing 60, and that the dragging rod 56 of the former is provided with a threaded portion 56a which has a left turn thread 56b and a right turn thread 56c different in pitch from the left turn thread 56b. When the dragging rod 56 is exerted on by an axially-oriented push force, the fastening member 54 is engaged with the left turn thread 56b such that the fastening member 54 turns around the axial direction of the dragging rod 56. When the dragging rod 56 is exerted on by an axially-oriented pull force, the fastening member 54 is engaged with the right turn thread 56c such that the fastening member 54 turns around the axial direction of the dragging rod 56 in view of the fastening member 54 being confined by the one-way bearing 60 to turn in only one direction. The dragging rod 56 is provided with various resistance forces in view of the left turn thread 56b being different in pitch from the right turn thread 56c.

Figure 7:
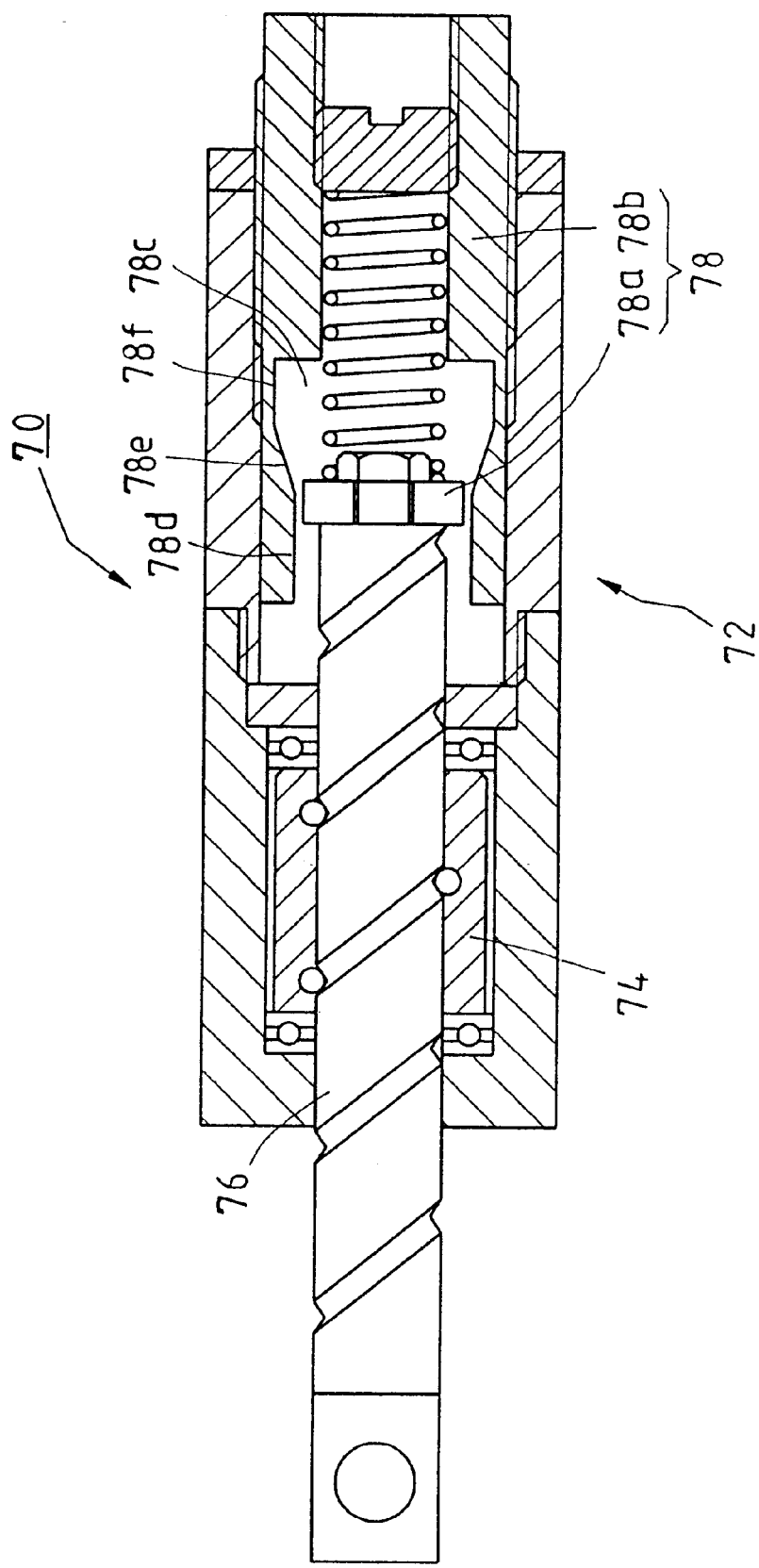
FIG. 7 shows a sectional view of a fourth preferred embodiment of the present invention.

As shown in FIG. 7, a damping device 70 of the fourth preferred embodiment of the present invention comprises a cylindrical body 72, a fastening member 74, a dragging rod 76, and an adjustment device 78.

The adjustment device 78 comprises a permanent magnet 78a fastened with one end of the dragging rod 76, and a magnetically permeable sleeve 78b. The sleeve 78b has an axial hole 78c which is provided along the axial direction thereof with three sections 78d, 78e, and 78f. The three sections 78d, 78e, and 78f are different in inner diameter from one another. In view of the fact that the intervals between the permanent magnet 78a and the three sections 78d, 78e and 78f of the sleeve 78b are different, various magnetic attraction forces are brought about at the time when the dragging rod 76 is engaged in an axial displacement. As a result, the dragging rod 76 is provided with various resistance forces when the dragging rod 76 is engaged in the axial displacement.

What is claimed is:

1. A linear motion damping device comprising:

a cylindrical body provided therein with a receiving compartment and an axial hole in communication with two ends of said receiving compartment;

a dragging rod provided with a threaded portion and located in said axial hole and said receiving compartment such that said dragging rod is caused to slide along an axial direction of said dragging rod;

a fastening member engaged with said threaded portion of said dragging rod such that said fastening member is located in said receiving compartment, and that said fastening member turns around said dragging rod at the time when said dragging rod is exerted on by an axially-oriented external force, thereby providing said dragging rod with a damping force against said dragging rod at the time when said dragging rod is engaged in a displacement along an axial direction thereof;

said two ends of said receiving compartment and said axial hole having a connection place with a first stepped surface and a second stepped surface;

said fastening member having a first end surface and a second end surface wherein said first end surface comes in contact with said first stepped surface at the time when said dragging rod is exerted on by an axially-oriented push force and wherein said second end surface comes in contact with said second stepped surface at the time when said dragging rod is exerted on by an axially-oriented pull force;

wherein said first end surface and said first stepped surface have a contact area;

and wherein said second end surface and said second stepped surface have a contact area unequal to said contact area of said first end surface and said first stepped surface.

2. The linear motion damping device as defined in claim 1, further comprising an adjustment device for increasing a resistance force against said fastening member at the time when said fastening member turns around said dragging rod.

3. The linear motion damping device as defined in claim 2, wherein said cylindrical body is provided with a threaded hole in communication with said receiving compartment; and wherein said adjustment device comprises:

a spherical body received in said threaded hole such that said spherical body is in contact with said fastening member;

a spring received in said threaded hole such that one end of said spring urges said spherical body; and an adjustment screw engaged with said threaded hole such that said adjustment screw presses against other end of said spring.

4. The linear motion damping device as defined in claim 3, wherein said threaded hole is provided in an outer periphery thereof with a graduated scale; and wherein said adjustment screw is provided in one end surface thereof with a pointer corresponding in location to said graduated scale.

5. The linear motion damping device as defined in claim 1, wherein said cylindrical body is provided with a cooling hole in communication with said receiving compartment and atmospheric air.

6. The linear motion damping device as defined in claim 5, wherein said fastening member is provided in an outer surface thereof with a plurality of grooves.

7. A linear motion damping device comprising:

a cylindrical body provided therein with a receiving compartment and an axial hole in communication with two ends of said receiving compartment;

a dragging rod provided with a threaded portion and located in said axial hole and said receiving compartment such that said dragging rod is caused to slide along an axial direction of said dragging rod;

a fastening member engaged with said threaded portion of said dragging rod such that said fastening member is located in said receiving compartment, and that said fastening member turns around said dragging rod at the time when said dragging rod is exerted on by an axially-oriented external force, thereby providing said dragging rod with a damping force against said dragging rod at the time when said dragging rod is engaged in a displacement along an axial direction thereof;

said two ends of said receiving compartment and said axial hole having a connection place with a first stepped surface and a second stepped surface;

said fastening member having a first end surface and a second end surface wherein said first end surface comes in contact with said first stepped surface at the time when said dragging rod is exerted on by an axially-oriented push force and wherein said second end surface comes in contact with said second stepped surface at the time when said dragging rod is exerted on by an axially-oriented pull force; and wherein said cylindrical body is provided with a cooling hole in communication with said receiving compartment and atmospheric air.

8. The linear motion damping device as defined in claim 7, wherein said first end surface and said first stepped surface have a contact area; and wherein said second end surface and said second stepped surface have a contact area unequal to said contact area of said first end surface and said first stepped surface.

9. The linear motion damping device as defined in claim 7, further comprising an adjustment device for increasing a resistance force against said fastening member at the time when said fastening member turns around said dragging rod.

10. The linear motion damping device as defined in claim 9, wherein said cylindrical body is provided with a threaded hole in communication with said receiving compartment; and wherein said adjustment device comprises:

a spherical body received in said threaded hole such that said spherical body is in contact with said fastening member;

a spring received in said threaded hole such that one end of said spring urges said spherical body; and and adjustment screw engaged with said threaded hole such that said adjustment screw presses against other end of said spring.

11. The linear motion damping device as defined in claim 10, wherein said threaded hole is provided in an outer periphery thereof with a graduated scale; and wherein said adjustment screw is provided in one end surface thereof with a pointer corresponding in location to said graduated scale.

12. The linear motion damping device as defined in claim 7, wherein said fastening member is provided in an outer surface thereof with a plurality of grooves.

* * * * *